United States Patent
Katoh et al.

(10) Patent No.: US 6,499,294 B1
(45) Date of Patent: Dec. 31, 2002

(54) EXHAUST GAS PURIFICATION DEVICE FOR AN INTERNAL COMBUSTION ENGINE

(75) Inventors: Kenji Katoh, Shizuoka-ken (JP); Takaaki Itou, Mishima (JP); Hiroshi Tanaka, Susono (JP); Shuichi Kubo, Aichi (JP); Yoshiyuki Mandokoro, Aichi (JP); Masahiro Taki, Aichi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/399,287

(22) Filed: Sep. 17, 1999

(30) Foreign Application Priority Data

Sep. 18, 1998 (JP) .............................. 10-264596
Aug. 3, 1999 (JP) .............................. 11-220418

(51) Int. Cl.$^7$ ................................ F01N 3/10
(52) U.S. Cl. ........................ 60/301; 502/304
(58) Field of Search .............. 60/285, 286, 297, 60/301, 299, 274; 422/171, 177, 180; 502/64, 65, 66, 304, 308; 423/239.1

(56) References Cited

U.S. PATENT DOCUMENTS

| | | | | |
|---|---|---|---|---|
| 5,051,241 A | * | 9/1991 | Pfefferle | 422/180 |
| 5,108,716 A | | 4/1992 | Nishizawa | |
| 5,332,554 A | * | 7/1994 | Yasaki et al. | 422/180 |
| 5,433,074 A | | 7/1995 | Seto et al. | |
| 5,471,836 A | * | 12/1995 | Takeshima et al. | 60/297 |
| 5,473,887 A | | 12/1995 | Takeshima et al. | |

(List continued on next page.)

FOREIGN PATENT DOCUMENTS

| | | |
|---|---|---|
| DE | 196 40 161 | 4/1998 |
| EP | 0 856 645 | 8/1998 |
| EP | 0 885 657 | 12/1998 |
| JP | 6-66185 | 3/1994 |
| JP | 6-93842 | 4/1994 |
| JP | 6-221140 | 8/1994 |
| JP | 8-150322 | 6/1996 |
| JP | 9-10601 | 1/1997 |
| JP | WO97/43035 | 11/1997 |
| JP | 10-99687 | 4/1998 |
| JP | 11-2114 | 1/1999 |
| JP | 11-101125 | 4/1999 |
| JP | 11-107740 | 4/1999 |
| WO | WO93/07363 | 4/1993 |
| WO | WO96/17671 | 6/1996 |
| WO | WO 97/23278 | 7/1997 |
| WO | WO97/47863 | 12/1997 |

*Primary Examiner*—Thomas Denion
*Assistant Examiner*—Tu M. Nguyen
(74) *Attorney, Agent, or Firm*—Kenyon & Kenyon

(57) ABSTRACT

A converter containing a NOx absorbing and reducing catalyst is disposed in the exhaust passage of an internal combustion engine. The upstream half portion (portion of the inlet side) of the substrate of the NOx absorbing and reducing catalyst in the converter carries the oxygen storage component that absorbs oxygen in the exhaust gas when the air-fuel ratio of the exhaust gas is lean and releases the absorbed oxygen when the air-fuel ratio of the exhaust gas flowing in is rich in addition to carrying the NOx absorbing and reducing catalyst. After NOx is absorbed by the NOx absorbing and reducing catalyst as a result of operating the engine at a lean air-fuel ratio, the engine is operated at a rich air-fuel ratio, so that NOx is released from the NOx absorbing and reducing catalyst and is purified by reduction. Here, oxygen is released from the oxygen storage component carried by the upstream half portion of the substrate and is reacted with the $H_2$ and CO components in the exhaust gas, so that the temperature of the NOx absorbing and reducing catalyst is raised within short periods of time due to the heat of reaction. Therefore, the catalyst exhibits increased activity and the NOx absorbing and reducing catalyst exhibits improved NOx purification capability.

3 Claims, 4 Drawing Sheets

U.S. PATENT DOCUMENTS

| | | | | |
|---|---|---|---|---|
| 5,677,258 A | * | 10/1997 | Kurokawa et al. | 502/304 |
| 5,743,087 A | * | 4/1998 | Zahn et al. | 60/301 |
| 5,750,082 A | * | 5/1998 | Hepburn et al. | 502/304 |
| 5,795,840 A | * | 8/1998 | Takami et al. | 502/304 |
| 5,866,078 A | * | 2/1999 | Pfefferle et al. | 422/177 |
| 5,874,057 A | * | 2/1999 | Deeba et al. | 423/239.1 |
| 5,884,473 A | * | 3/1999 | Noda et al. | 60/301 |
| 5,948,376 A | * | 9/1999 | Miyoshi et al. | 502/304 |
| 5,950,421 A | * | 9/1999 | Chattha et al. | 60/274 |
| 5,958,826 A | * | 9/1999 | Kurokawa et al. | 502/304 |
| 5,958,828 A | * | 9/1999 | Murakami et al. | 502/304 |
| 5,974,788 A | * | 11/1999 | Hepburn et al. | 60/285 |
| 5,992,142 A | * | 11/1999 | Pott | 60/301 |
| 6,026,639 A | * | 2/2000 | Kumar | 60/285 |
| 6,044,644 A | * | 4/2000 | Hu et al. | 60/299 |
| 6,216,450 B1 | * | 4/2001 | Takahashi et al. | 60/274 |

* cited by examiner

EXHAUST GAS →

EXHAUST GAS PURIFICATION DEVICE FOR AN INTERNAL COMBUSTION ENGINE

BACKGROUND OF THE INVENTION

1. Field of the Invention

The present invention relates to an exhaust gas purification device for an internal combustion engine. More specifically, the invention relates to an exhaust gas purification device equipped with a NOx absorbing and reducing catalyst which absorbs NOx in the exhaust gas when the air-fuel ratio of the exhaust gas flowing in is lean, and releases and purifies by reduction the absorbed NOx when the air-fuel ratio of the exhaust gas flowing in is rich.

2. Description of the Related Art

There has been known a NOx absorbing and reducing catalyst which absorbs NOx (nitrogen oxides) in the exhaust gas when the air-fuel ratio of the exhaust gas flowing in is lean, and releases and purifies, by reduction, the absorbed NOx when the air-fuel ratio of the exhaust gas flowing in becomes rich.

An exhaust gas purification device using the NOx absorbing and reducing catalyst of this type has been disclosed in, for example, Japanese Patent No. 2600492. In the exhaust gas purification device of the above patent, the NOx absorbing and reducing catalyst is disposed in the exhaust passage of an engine that operates at a lean air-fuel ratio. During a lean air-fuel ratio operation of the engine, NOx in the exhaust gas is absorbed by the NOx absorbing and reducing catalyst. When NOx is absorbed in an increased amount by the NOx absorbing and reducing catalyst, the rich spike operation is executed to operate the engine at an air-fuel ratio (or rich air-fuel ratio) smaller than the stoichiometric air-fuel ratio for a short period of time. Thus, the NOx that is absorbed is released from the NOx absorbing and reducing catalyst, and the released NOx is purified by reduction. That is, when the engine operating air-fuel ratio becomes rich, the oxygen concentration in the exhaust gas sharply drops compared with when the engine is operated at a lean air-fuel ratio, and the amounts of unburned HC and CO components sharply increase in the exhaust gas. Therefore, when the operating air-fuel ratio is changed over to a rich air-fuel ratio by the rich spike operation, NOx is released from the NOx absorbing and reducing catalyst and is reduced by being reacted with the unburned HC and CO components in the exhaust gas on the NOx absorbing and reducing catalyst.

The above-mentioned Japanese Patent No. 2600492 further discloses a constitution for purifying the HC and CO components emitted from the engine at the start of the engine by disposing a three-way catalyst in the exhaust passage on the upstream side of the NOx absorbing and reducing catalyst. The three-way catalyst of the above patent is disposed near the engine exhaust manifold through which the exhaust gas of a high temperature from the engine passes, and is heated to the activated temperature within a short period of time after the start of the engine. Therefore, HC and CO emitted in relatively large amounts from the engine are oxidized by the three-way catalyst after the engine started, and the quality of the exhaust gas, before the engine is warmed-up, is improved.

With the three-way catalyst being disposed in the exhaust passage on the upstream side of the NOx absorbing and reducing catalyst as taught in the above-mentioned Japanese Patent No. 2600492, it was considered that the ability of the NOx absorbing and reducing catalyst for purifying the exhaust gas often drops when the three-way catalyst possesses an $O_2$ storage capability due to a delay in the change of the air-fuel ratio of the exhaust gas flowing into the NOx absorbing and reducing catalyst.

As is widely known, the three-way catalyst carries, as an additive, a metal component such as cerium Ce in addition to noble metal catalyst components such as platinum Pt, palladium Pd and rhodium Rh, so as to exhibit the $O_2$ storage capability. That is, cerium carried as an additive by the catalyst bonds to oxygen in the exhaust gas when the air-fuel ratio of the exhaust gas flowing into the catalyst is higher than the stoichiometric air-fuel ratio (when the air-fuel ratio of the exhaust gas is lean) to form ceria (cerium oxide IV: $CeO_2$) which stores oxygen. Further, when the air-fuel ratio of the exhaust gas flowing in is smaller than the stoichiometric air-fuel ratio (when the air-fuel ratio of the exhaust gas is rich), ceria releases oxygen and is transformed into cerium oxide III ($Ce_2O_3$); i.e., oxygen is released. Thus, the three-way catalyst having an $O_2$ storage capability releases oxygen when the air-fuel ratio of the exhaust gas changes from the lean side to the rich side, and the air-fuel ratio of the exhaust gas that has passed through the three-way catalyst is maintained to be close to the stoichiometric air-fuel ratio, as long as oxygen is released from the three-way catalyst, even when the air-fuel ratio of the exhaust gas flowing into the three-way catalyst has changed to the rich side.

However, when the three-way catalyst disposed in the exhaust passage on the upstream side of the NOx absorbing and reducing catalyst possesses an $O_2$ storage capability, the exhaust gas flowing into the NOx absorbing and reducing catalyst does not readily acquire a rich air-fuel ratio but is temporarily maintained near the stoichiometric air-fuel ratio even when the air-fuel ratio of the exhaust gas from the engine has changed from the lean side to the rich side due to the rich spike operation of the engine. When the air-fuel ratio of the exhaust gas is changed from a lean air-fuel ratio to an air-fuel ratio close to the stoichiometric air-fuel ratio, NOx is released from the NOx absorbing and reducing catalyst. However, in this case, the air-fuel ratio of the exhaust gas is not rich enough, i.e., the exhaust gas is not containing HC and CO components in amounts sufficient for reducing all of NOx released and, hence, NOx that has not been reduced flows out to the downstream side of the NOx absorbing and reducing catalyst.

When the NOx absorbing and reducing catalyst was used, therefore, it was not considered desirable to dispose the three-way catalyst having an $O_2$ storage capability in the exhaust passage on the upstream side of the NOx absorbing and reducing catalyst. When the three-way catalyst was disposed in the exhaust passage on the upstream side, therefore, it was considered that some countermeasure is required, for example, to remove cerium from the three-way catalyst, in order to lower the $O_2$ storage capability.

According to the study conducted by the present inventors, however, it was found that when NOx is to be released from the NOx absorbing and reducing catalyst, the NOx absorbing and reducing catalyst exhibits enhanced performance for purifying NOx when the three-way catalyst or the like catalyst having $O_2$ storage components is disposed at a position close to the NOx absorbing and reducing catalyst on the upstream side thereof. That is, when NOx is to be released from the NOx absorbing and reducing catalyst, the exhaust gas flowing into the catalyst must have a rich air-fuel ratio. In this case, when oxygen is released from the $O_2$ storage components disposed at a position close to the NOx absorbing and reducing catalyst on the upstream side thereof, it has been found that NOx is released and reduced at a greatly increased rate.

It has not been clarified yet why the catalyst having $O_2$ storage components disposed near the NOx absorbing and reducing catalyst on the upstream side thereof helps improve the performance of the NOx absorbing and reducing catalyst for purifying the exhaust gas. However, one of the causes is considered to be that, if the $O_2$ storage components exist at a position close to the upstream side of the NOx absorbing and reducing catalyst when the exhaust gas of a rich air-fuel ratio is supplied, the HC and CO components in the exhaust gas are oxidized by the oxygen released from the $O_2$ storage components and the temperature of the catalyst components on the NOx absorbing and reducing catalyst rises due to the heat of reaction. That is, one of the reasons is attributed to the release of NOx from the NOx absorbing and reducing catalyst promoted by the rise of temperature of the NOx absorbing and reducing catalyst components, whereby the catalytic activity is improved to improve the NOx purification ratio. Though this point will be described later in detail, there arises a problem in that the purifying performance of the NOx absorbing and reducing catalyst often cannot be utilized to a sufficient degree, contrary to the conventional opinion, if the $O_2$ storage capability is eliminated as much as possible from the three-way catalyst or the like catalyst disposed on the upstream side of the NOx absorbing and reducing catalyst.

When the exhaust gas is rendered to possess a rich air-fuel ratio by executing the rich spike operation during the lean air-fuel ratio operation as taught in the above-mentioned Japanese Patent No. 2600492, the amounts of HC and CO components in the exhaust gas increase sharply. However, the HC and CO components tend to adhere on the catalyst components on the NOx absorbing and reducing catalyst. When the amounts of HC and CO components sharply increase in the exhaust gas flowing into the NOx absorbing and reducing catalyst, therefore, the surfaces of the catalyst components are covered with HC and CO. Therefore, the catalytic function drops, i.e., HC contamination and CO contamination take place, and the NOx absorbing and reducing catalyst exhibits decreased ability for purifying NOx.

SUMMARY OF THE INVENTION

The object of the present invention is to provide an exhaust gas purification device for an internal combustion engine capable of exhibiting a high NOx conversion capability by solving one or more of the above-mentioned problems.

The objects as set forth above are achieved by an exhaust gas purification device for an internal combustion engine, according to the present invention, comprising a NOx absorbing and reducing catalyst, which absorbs NOx in the exhaust gas when the air-fuel ratio of the exhaust gas flowing in is lean and releases the absorbed NOx and purifies it by reduction when the air-fuel ratio of the exhaust gas flowing in is rich, disposed in an exhaust passage of the internal combustion engine, which is capable of selecting, as required, the operation at a lean air-fuel ratio and the operation at a rich air-fuel ratio, so that the NOx absorbing and reducing catalyst absorbs NOx in the exhaust gas when the engine is operated at a lean air-fuel ratio and that the absorbed NOx is released from the NOx absorbing and reducing catalyst and is purified by reduction when the engine is operated at a rich air-fuel ratio;

wherein oxygen storage components which absorb oxygen in the exhaust gas when the air-fuel ratio of the exhaust gas is lean and release the absorbed oxygen when the air-fuel ratio of the exhaust gas is rich are carried by a substrate of the NOx absorbing and reducing catalyst on the upstream half portion of the substrate between an exhaust gas inlet side end to a central portion thereof.

According to this aspect of the invention, the oxygen storage components having $O_2$ storage capability are carried by the upstream half portion of the NOx absorbing and reducing catalyst substrate. When the exhaust gas flowing into the NOx absorbing and reducing catalyst is rendered to possess a rich air-fuel ratio in order to release NOx from the NOx absorbing and reducing catalyst and to purify it by reduction, oxygen is released from the oxygen storage components and, at the same time, $H_2$ and CO in the exhaust gas are oxidized with oxygen absorbed by the oxygen storage components on the surface of the substrate of the NOx absorbing and reducing catalyst, i.e., near the surfaces of the catalyst components of the NOx absorbing and reducing catalyst, whereby the temperature of the NOx absorbing and reducing catalyst components rises due to the heat of oxidation reaction. Accordingly, the NOx absorbing and reducing catalyst exhibits improved activity, and NOx is released at an increased rate from the NOx absorbing and reducing catalyst to enhance the efficiency for reducing the released NOx.

When the air-fuel ratio of the exhaust gas flowing into the NOx absorbing and reducing catalyst is lean, NOx in the exhaust gas flowing in is mainly absorbed by the NOx absorbing and reducing catalyst carried by the one-half (upstream half portion) of the catalyst substrate on the side of the inlet, and the amount of NOx absorption becomes greater in the upstream half portion than in the latter half portion. At the time of releasing NOx, therefore, NOx is mainly released from the upstream half portion of the substrate. With the oxygen storage components being carried by the upstream half portion of the carrier, therefore, the released NOx is efficiently purified by reduction in the whole device.

According to another aspect of the present invention, there is provided an exhaust gas purification device for an internal combustion engine, comprising a NOx absorbing and reducing catalyst which absorbs NOx in the exhaust gas when the air-fuel ratio of the exhaust gas flowing in is lean and releases the absorbed NOx and purify it by reduction when the air-fuel ratio of the exhaust gas flowing in is rich disposed in an exhaust passage of the internal combustion engine which is capable of selecting, as required, the operation at a lean air-fuel ratio and the operation at a rich air-fuel ratio, so that the NOx absorbing and reducing catalyst absorbs NOx in the exhaust gas when the engine is operated at a lean air-fuel ratio and that the absorbed NOx is released from the NOx absorbing and reducing catalyst and is purified by reduction when the engine is operated at a rich air-fuel ratio;

wherein a three-way catalyst is disposed in the exhaust passage of the engine on the upstream side of the NOx absorbing and reducing catalyst and neighboring the NOx absorbing and reducing catalyst substrate.

According to this aspect of the invention, a separate three-way catalyst is disposed on the upstream side of the NOx absorbing and reducing catalyst and close thereto. When the engine is operated at a rich air-fuel ratio to release NOx from the NOx absorbing and reducing catalyst, the amounts of HC and CO components sharply increase in the exhaust gas flowing into the NOx absorbing and reducing catalyst. According to the present invention, however, the three-way catalyst is disposed at the position upstream of and close to the NOx absorbing and reducing catalyst. Therefore, the HC and CO components in the exhaust gas partly react on the three-way catalyst, and the HC and CO components flowing into NOx absorbing and reducing catalyst are prevented from sharply increasing. This suppresses the contamination of the NOx absorbing and reducing catalyst caused by an increase in the HC and CO components in the exhaust gas.

Further, the three-way catalyst creates the water-gas-shift reaction by which $H_2$ is formed from CO and $H_2O$ under a rich air-fuel ratio condition. $H_2$ is very strongly reductive and is more effective as a reducing agent for reducing NOx released from the NOx absorbing and reducing catalyst than HC and CO. Upon arranging the three-way catalyst on the upstream side of the NOx absorbing and reducing catalyst as is done in the present invention, therefore, it is allowed to decrease the amount of CO in the exhaust gas and to prevent the occurrence of contamination due to CO, as well as to efficiently reduce NOx that is released by supplying $H_2$ to the NOx absorbing and reducing catalyst. Depending on the type of the engine, further, the HC component is contained in relatively large amounts in the exhaust gas during the lean air-fuel ratio operation and, hence, the NOx absorbing and reducing catalyst may often be contaminated even during the lean air-fuel ratio operation. Upon arranging the three-way catalyst on the upstream side of the NOx absorbing and reducing catalyst as described above, however, the occurrence of HC contamination is prevented while the engine is operating at a lean air-fuel ratio.

According to another aspect of the present invention, there is provided an exhaust gas purification device for an internal combustion engine, comprising a NOx absorbing and reducing catalyst which absorbs NOx in the exhaust gas when the air-fuel ratio of the exhaust gas flowing in is lean and releases the absorbed NOx and purifies it by reduction when the air-fuel ratio of the exhaust gas flowing in is rich disposed in an exhaust passage of the internal combustion engine which is capable of selecting, as required, the operation at a lean air-fuel ratio and the operation at a rich air-fuel ratio, so that the NOx absorbing and reducing catalyst absorbs NOx in the exhaust gas when the engine is operated at a lean air-fuel ratio and that the absorbed NOx is released from the NOx absorbing and reducing catalyst and is purified by reduction when the engine is operated at a rich air-fuel ratio;

wherein the NOx absorbing and reducing catalyst includes a substrate, a NOx absorbing and reducing catalyst layer carrying NOx absorbing and reducing catalyst components on the substrate, and an oxygen storage component layer carrying oxygen storage components which absorb oxygen in the exhaust gas when the air-fuel ratio of the exhaust gas is lean and release the absorbed oxygen when the air-fuel ratio of the exhaust gas is rich, the oxygen storage component layer being formed on the NOx absorbing and reducing catalyst layer.

According to this aspect of the invention, the NOx absorbing and reducing catalyst has a two-layer-coated structure including the NOx absorbing and reducing catalyst layer formed on the substrate, and the oxygen storage component layer formed on the upper side (i.e., on the exhaust side) of the NOx absorbing and reducing catalyst layer. When NOx is released from the NOx absorbing and reducing catalyst, therefore, heat produced by the reaction of CO and the like in the exhaust gas in the oxygen storage component layer is directly transmitted to the NOx absorbing and reducing catalyst components, whereby the temperature of the NOx absorbing and reducing catalyst components is efficiently raised.

BRIEF DESCRIPTION OF THE DRAWINGS

The present invention will be better understood from the description as set forth hereinafter with reference to the accompanying drawings in which.

DESCRIPTION OF THE PREFERRED EMBODIMENTS

Hereinafter, embodiments of the exhaust gas purification device according to the present invention will be explained with reference to the attached drawings.

Figure 1:
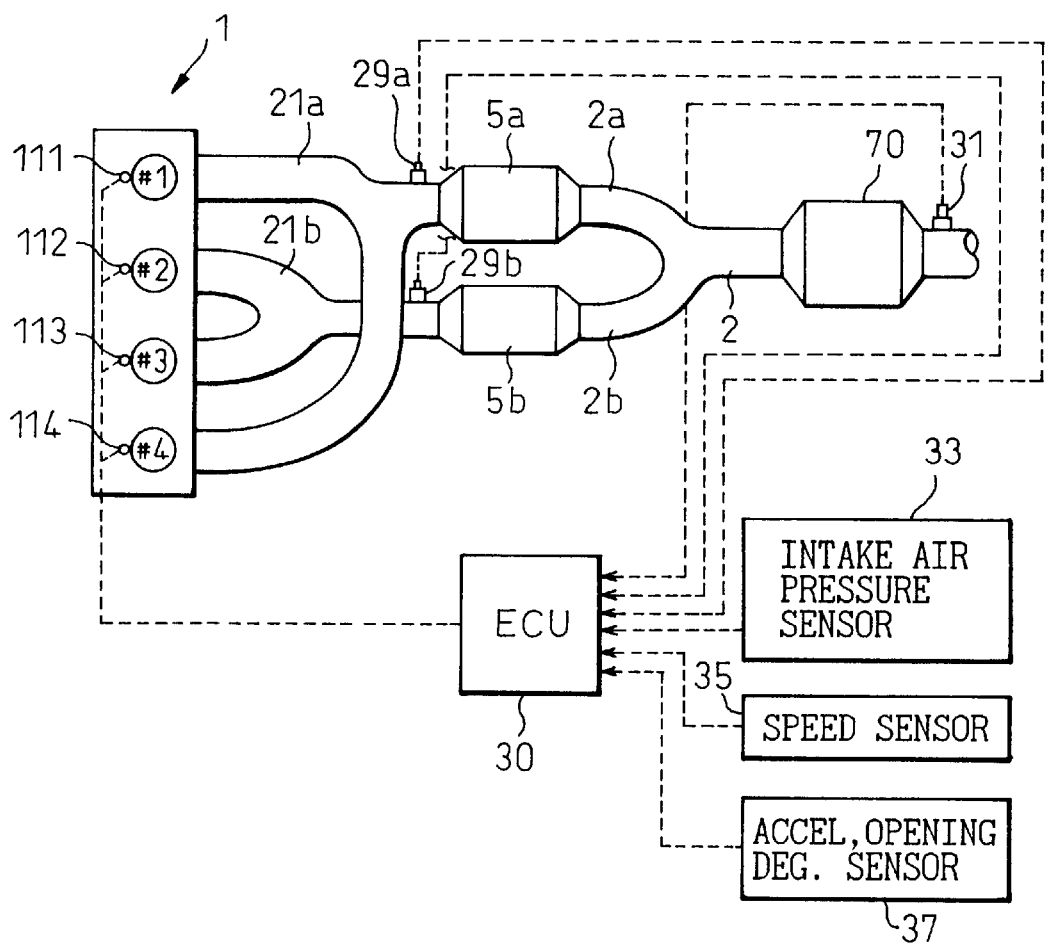
FIG. 1 is a view schematically illustrating an embodiment of the present invention when it is applied to an internal combustion engine for automobiles.

FIG. 1 is a view schematically illustrating the constitution of an embodiment in which the present invention is applied to an internal combustion engine for automobiles.

In FIG. 1, reference numeral 1 denotes an internal combustion engine for automobiles. In this embodiment, the engine 1 is a four-cylinder gasoline engine having four cylinders #1 to #4 which are equipped with fuel injection valves 111 to 114 for injecting fuel directly into the cylinders. As will be described later, the internal combustion engine 1 of this embodiment is a lean burn engine, i.e., an engine capable of operating at a lean air-fuel ratio larger than a stoichiometric air-fuel ratio.

In this embodiment, the cylinders #1 to #4 are divided into two groups each including two cylinders for which the ignition timings do not occur consecutively (in the embodiment of FIG. 1, for example, the order of igniting the cylinders is 1-3-4-2, the cylinders #1 and #4 constituting a group, and the cylinders #2 and #3 constituting another group). Exhaust ports of the cylinders are connected to exhaust manifolds for each of the cylinder groups, and are connected to exhaust passages for each of the cylinder groups. In FIG. 1, reference numeral 21a denotes an exhaust manifold for connecting the exhaust ports of the group of cylinders #1 and #4 to a separate exhaust passage 2a, and 21b denotes an exhaust manifold for connecting the exhaust ports of the group of cylinders #2 and #4 to another separate exhaust passage 2b. In this embodiment, start catalysts 5a and 5b comprising three-way catalysts are disposed in the separate exhaust passages 2a and 2b. The separate exhaust passages 2a and 2b meet together in a common exhaust passage 2 on the downstream side of the start catalysts.

In the common exhaust passage 2 is disposed a converter 70 having a NOx absorbing and reducing catalyst 7, that will be described later, contained in a casing. The constitution of the converter 70 will be described later.

In FIG. 1, reference numerals 29a and 29b denote upstream air-fuel ratio sensors disposed in the separate exhaust passages 2a and 2b on the upstream side of the start catalysts 5a and 5b, and reference numeral 31 denotes a downstream air-fuel ratio sensor disposed in the exhaust passage 2 on the downstream side of the converter 70. The air-fuel ratio sensors 29a, 29b and 31 are so-called linear air-fuel ratio sensors that produce voltage signals corresponding to the air-fuel ratios of the exhaust gas over a wide range of air-fuel ratios.

In FIG. 1, further, reference numeral 30 denotes an electronic control unit (ECU) for the engine 1. In this embodiment, the ECU 30 is a microcomputer of a known constitution including RAM, ROM and CPU, and executes basic control operations such as controlling the ignition timings for the engine 1 and controlling the fuel injection. In addition to executing the above-mentioned basic control operations, the ECU 30 in this embodiment executes the control operation to change the engine operating air-fuel ratio by changing the fuel injection mode of the direct cylinder fuel injection valves 111 to 114 based on the engine operating conditions, as will be described later. In this embodiment, further, the ECU 30 estimates the amount of NOx absorbed in the NOx absorbing and reducing catalyst relying on the engine operating condition, by a method that will be described later, and executes the rich spike operation for changing the operating air-fuel ratio over to a rich air-fuel ratio for a short period of time during the lean air-fuel ratio operation of the engine to release the absorbed NOx when the estimated amount of NOx absorption has increased to a predetermined amount.

The input ports of the ECU 30 receive signals from the upstream air-fuel ratio sensors 29a and 29b representing the air-fuel ratios of the exhaust gas on the upstream side of the start catalysts 5a and 5b, receive a signal from the air-fuel ratio sensor 31 representing the air-fuel ratio of the exhaust gas on the downstream side of the converter 70, receive a signal corresponding to the intake air pressure of the engine from an intake air pressure sensor 33 disposed in the engine intake manifold that is not shown, and further receive a signal corresponding to the engine rotational speed from a rotational speed sensor 35 disposed near the engine crank shaft (not shown). In this embodiment, further, the ECU 30 receives through the input port a signal representing the amount the accelerator pedal is depressed by a driver (degree of accelerator opening) from an accelerator opening degree sensor 37 disposed near the accelerator pedal (not shown) of the engine. The output ports of the ECU 30 are connected to the fuel injection valves 111 to 114 of the cylinders through a fuel injection circuit that is not shown in order to control the amounts of fuel injection into the cylinders and the timings for fuel injection.

In this embodiment, the ECU 30 operates the engine 1 in one of the following five combustion modes based on the engine operating conditions:

① A lean air-fuel ratio stratified charge combustion (fuel is injected during the compression stroke of the cylinder);

② A lean air-fuel ratio uniform mixture/stratified charge combustion (fuel is injected during the intake stroke and the compression stroke of the cylinder);

③ A lean air-fuel ratio uniform mixture combustion (fuel is injected during the intake stroke of the cylinder);

④ A stoichiometric air-fuel ratio uniform mixture combustion (fuel is injected during the intake stroke of the cylinder); and ⑤ A rich air-fuel ratio uniform mixture combustion (fuel is injected during the intake stroke of the cylinder).

In the light-load operating region of the engine 1, the lean air-fuel ratio uniform mixture combustion ① is effected. In this state, fuel is injected into the cylinder only one time in the latter half of the compression stroke of the cylinder, and the injected fuel forms a layer of the mixture of a combustible air-fuel ratio near the spark plug in the cylinder. In this operating condition, the fuel is injected in a very small amount, and the air-fuel ratio in the cylinder as a whole is from about 25 to about 30.

As the load increases from the state ① above to enter into the low-load operating region, the lean air-fuel ratio uniform mixture/stratified charge combustion ② is effected. The amount of fuel injected into the cylinder increases with an increase in the engine load. In the case of the stratified charge combustion ① in which fuel is injected in the latter half of the compression stroke, a limitation is imposed on the injection time and, hence, a limitation is imposed on the amount of fuel that can be used for forming the stratified charge. In this load region, therefore, fuel is injected in the upstream half of the intake stroke in an amount to compensate for the lack of fuel injected in the latter half of the compression stroke, so that fuel is supplied in a target amount into the cylinder. Fuel injected into the cylinder in the upstream half of the intake stroke forms a very lean uniform mixture before being ignited. In the latter half of the compression stroke, fuel is further injected into this very lean and uniform mixture thereby to form a layer of the combustible mixture that can be ignited near the spark plug. At the time of ignition, the layer of the combustible mixture starts burning, and the flame propagates to the surrounding lean mixture layer to realize a stable combustion. In this state, the amount of fuel supplied by being injected in the intake stroke and in the compression stroke, becomes greater than the amount in the state ①, but the air-fuel ratio as a whole is still lean (e.g., about 20 to about 30 in terms of the air-fuel ratio).

As the engine load further increases, the engine 1 effects the lean air-fuel ratio uniform mixture combustion ③. In this state, the fuel is injected only one time in the upstream half of the intake stroke, and the amount of fuel injection becomes larger than that of ② above. The uniform mixture formed in the cylinder in this state assumes a lean air-fuel ratio (e.g., about 15 to 25 in terms of the air-fuel ratio) which is relatively close to the stoichiometric air-fuel ratio.

As the engine load further increases to enter into the high-load operating region of the engine, the amount of fuel is further increased from the state ③, and the stoichiometric air-fuel ratio uniform mixture operation ④ is effected. In this state, a uniform mixture of the stoichiometric air-fuel ratio is formed in the cylinder, and the engine produces an increased output. As the engine load further increases to enter into the full-load operating region, the amount of fuel injection is further increased from the state ④, and the rich air-fuel ratio uniform mixture operation ⑤ is effected. In this state, the uniform mixture formed in the cylinder acquires a rich air-fuel ratio (e.g., about 12 to 14 in terms of the air-fuel ratio).

In this embodiment, optimum operation modes (① to ⑤) have been set in advance through experiment based on the degree of accelerator opening (amount the accelerator pedal is depressed by the driver) and the engine rotational speed, and have been stored in the ROM of ECU 30 as a map using the degree of accelerator opening and the engine rotational speed. While the engine 1 is in operation, the ECU 30 determines which operation mode must be selected out of the above-mentioned operation modes ① to t based on the degree of accelerator opening detected by the accelerator opening degree sensor 37 and the engine rotational speed, and determines the amount of fuel injection and the timing for fuel injection based on the mode.

When the mode (lean air-fuel ratio combustion) is selected out of ① to ③, the ECU 30 determines the amount of fuel injection from the degree of accelerator opening and the engine rotational speed based on the map prepared in advance for each of the modes ① to ③. When the mode (stoichiometric air-fuel ratio or rich air-fuel ratio uniform mixture combustion) is selected from ④ and ⑤, the ECU 30 determines the amount of fuel injection from the intake air pressure detected by the intake air pressure sensor 33 and the engine rotational speed based on the map prepared in advance for each of the modes ④ and ⑤.

When the mode ④ (stoichiometric air-fuel ratio uniform mixture combustion) is selected, the ECU 30 corrects, by feedback, the amount of fuel injection calculated as described above based on the outputs of the air-fuel ratio sensors 29a, 29b and 31, so that the air-fuel ratio of the exhaust gas from the engine becomes the stoichiometric air-fuel ratio.

Next, described below is the converter 70 according to this embodiment.

Figure 2:
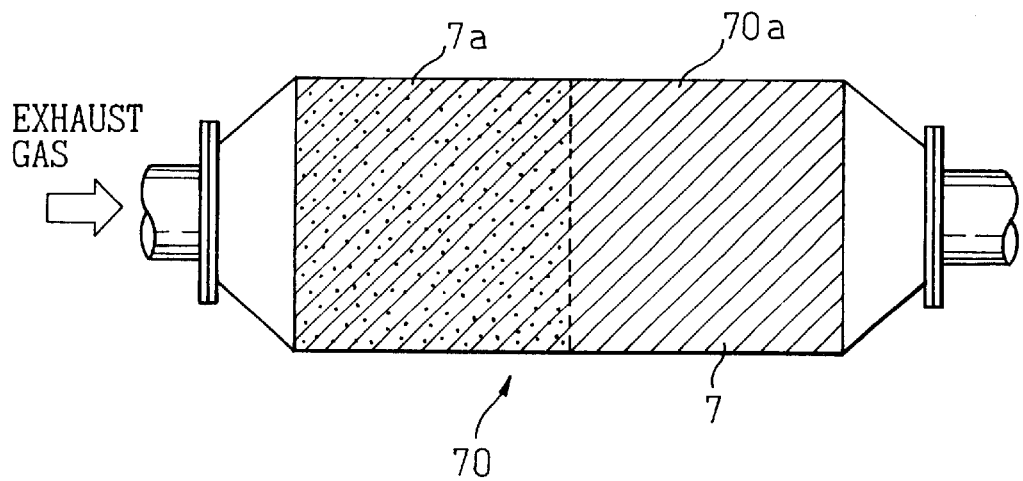
FIG. 2 is a sectional view illustrating the constitution of an embodiment of a converter of FIG. 1.

FIG. 2 is a sectional view illustrating the constitution of the converter 70 according to the embodiment. The converter 70 is of the form in which a NOx absorbing and reducing catalyst 7 is contained in a casing 70a.

The NOx absorbing and reducing catalyst 7 according to this embodiment uses a substrate of, for example, honeycomb-shaped cordierite of which the surface is coated with alumina to carry at least one component selected from alkali metals such as potassium K, sodium Na, lithium Li and cesium Cs, alkaline earth metals such as barium Ba and calcium Ca, and rare earth metals such as lanthanum La, cerium Ce and yttrium Y, as well as a noble metal such as platinum Pt. The NOx absorbing and reducing catalyst exhibits the NOx absorbing and releasing action absorbing NOx ($NO_2$, NO) in the exhaust gas in the form of nitric acid ions $NO_3^-$ when the air-fuel ratio of the exhaust gas flowing in is lean, and releasing NOx which it has absorbed when the oxygen concentration drops in the exhaust gas flowing in.

When, for example, the engine 1 is operated at a lean air-fuel ratio and the exhaust gas of a lean air-fuel ratio flows into the NOx absorbing and reducing catalyst 7, NOx (NO) in the exhaust gas is oxidized on platinum Pt to form nitric acid ions. When, for example, BaO is used as an absorbent, the nitric acid ions are absorbed by the absorbent and diffuse in the absorbent in the form of nitric acid ions $NO_3^-$ while being bonded to barium oxide BaO. In a lean atmosphere, therefore, NOx in the exhaust gas is absorbed by the NOx absorbent in the form of a nitrate.

When the oxygen concentration sharply decreases in the exhaust gas flowing in (i.e., when the exhaust gas acquires the stoichiometric air-fuel ratio or a rich air-fuel ratio), nitric acid ions are formed in decreased amounts on platinum Pt and, hence, the reaction proceeds in the reverse direction releasing nitric acid ions $NO_3^-$ in the form of $NO_2$ from the absorbent. Here, when the exhaust gas contains components that serve as reducing agents, such as CO, HC and $H_2$, then, $NO_2$ is reduced with these components on platinum Pt.

In this embodiment, further, a metal component such as cerium Ce is carried as an oxygen storage component in a relatively large amount on the alumina layer on the half portion (upstream half portion) 7a of the substrate on the exhaust gas inlet side in addition to the NOx absorbing and reducing catalyst component, in order to impart the $O_2$ storage capability. When the exhaust gas flowing into the catalyst has an air-fuel ratio higher than the stoichiometric air-fuel ratio (when the air-fuel ratio of the exhaust gas is lean), cerium carried on the alumina layer bonds to oxygen in the exhaust gas to form ceria (cerium oxide IV: $CeO_2$) to store oxygen. When the air-fuel ratio of the exhaust gas flowing in is smaller than the stoichiometric air-fuel ratio (when the air-fuel ratio of the exhaust gas is rich), ceria releases oxygen and is transformed into cerium oxide III ($Ce_2O_3$); i.e., oxygen is released. Thus, the oxygen storage component exhibits the $O_2$ storage action in which the components absorb oxygen in the exhaust gas when the air-fuel ratio of the exhaust gas flowing in is lean and release oxygen into the exhaust gas when the air-fuel ratio of the exhaust gas flowing in becomes rich.

In this embodiment, when the amount of NOx absorbed by the NOx absorbing and reducing catalyst 7 increases during the lean air-fuel ratio operation of the engine 1, the rich spike operation is executed to change the engine air-fuel ratio from a lean air-fuel ratio to a rich air-fuel ratio for a short period of time, in order to release NOx from the NOx absorbing and reducing catalyst and to purify it by reduction.

In this embodiment, the ECU 30 increases or decreases the value of a NOx counter to estimate the amount of NOx absorbed by the NOx absorbing and reducing catalyst 7. The amount of NOx absorbed by the NOx absorbing and reducing catalyst 7 per a unit time is proportional to the amount of NOx in the exhaust gas flowing into the NOx absorbing and reducing catalyst per a unit time, i.e., proportional to the amount of NOx emitted by the engine 1 per a unit time. On the other hand, the amount of NOx emitted by the engine per a unit time is determined by the amount of fuel supplied to the engine, air-fuel ratio and flow rate of the exhaust gas. It is therefore possible to know the amount of NOx absorbed by the NOx absorbing and reducing catalyst when the engine operating conditions are determined. In this embodiment, the amounts of NOx emitted by the engine per a unit time are measured in advance by changing the engine operating conditions (degree of accelerator opening, rotational speed of the engine, intake air amount, intake air pressure, air-fuel ratio, amount of fuel supplied, etc.), and the amounts of NOx absorbed by the NOx absorbing and reducing catalyst 7 per unit time are stored in the ROM in the ECU 30 in the form of a numerical value map using, for example, the engine load (amount of fuel injection) and the rotational speed of the engine. The ECU 30 calculates the amount of NOx absorbed by the NOx absorbing and reducing catalyst per unit time from the engine load (amount of fuel injection) and the engine rotational speed by using the map at a regular interval (every after the above-mentioned unit time), and increases the NOx counter by the absorbed amount of NOx. Therefore, the value of the NOx counter represents the amount of NOx absorbed by the NOx absorbing and reducing catalyst 7 at all times. When the value of the NOx counter increases in excess of a predetermined value during the lean air-fuel ratio operation of the engine, the ECU 30 changes the operation of the engine over to a rich air-fuel ratio operation (above-mentioned mode ④ or ⑤) for a short period of time to change the air-fuel ratio of the exhaust gas from the engine over to a rich air-fuel ratio. Then, the exhaust gas of a rich air-fuel ratio flows into the NOx absorbing and reducing catalyst 7 whereby NOx that has been absorbed is released from the NOx absorbing and reducing catalyst and is purified by reduction.

In this embodiment, cerium, which is an oxygen-storing component, is carried in a relatively large amount by the upstream half portion 7a of the substrate of the NOx absorbing and reducing catalyst 7 to greatly improve the NOx purification ratio when NOx is released from the NOx absorbing and reducing catalyst.

The reason has not been clarified yet why the oxygen storage component disposed near the NOx absorbing and reducing catalyst 7 helps improve the NOx purification ratio of the NOx absorbing and reducing catalyst, but it is thought to be as described below.

① Temperature rise of the NOx absorbing and reducing catalyst due to oxygen released from the oxygen storage component.

When, for example, cerium (Ce) is carried as an oxygen-storage component by the upstream half portion of the substrate of the NOx absorbing and reducing catalyst, cerium absorbs oxygen in the exhaust gas while the engine 1 is in operation at a lean air-fuel ratio. In a state where the cerium is saturated with oxygen which it has absorbed (state where all the cerium that is carried is bonded to oxygen and is transformed into ceria ($CeO_2$)), the air-fuel ratio is lean to a sufficient degree near the surfaces of the NOx absorbing and reducing catalyst 7, and the NOx absorbing and reducing catalyst 7 absorbs NOx in the exhaust gas.

After the NOx absorbing and reducing catalyst 7 has absorbed NOx in this state, the operating air-fuel ratio of the engine 1 is changed to a rich air-fuel ratio. Then, the oxygen concentration in the exhaust gas drops, and the HC, CO and $H_2$ components in the exhaust gas increase. As the exhaust gas having the rich air-fuel ratio comes in contact with the ceria ($CeO_2$), the oxygen storage component releases oxygen which reacts with CO and $H_2$ components in the exhaust gas. More correctly, the following reaction takes place between the ceria and the CO and $H_2$ components in the exhaust gas.

$$2CeO_2 + CO \rightarrow Ce_2O_3 + CO_2 + Q_1 \quad (1)$$

$$2CeO_2 + H_2 \rightarrow Ce_2O_3 + H_2O + Q_2 \quad (2)$$

The above reactions (1) and (2) are exothermic reactions generating relatively large amounts of heat $Q_1$ and $Q_2$. When the exhaust gas air-fuel ratio is changed to a rich air-fuel ratio, therefore, the ceria releases the heat in large amounts, and the temperature of the NOx absorbing and reducing catalyst disposed close thereto is rapidly raised.

As the temperature of the NOx absorbing and reducing catalyst rises, NOx absorbed by the NOx absorbent (e.g., BaO) in the form of nitric acid ions migrates at an increased rate onto the noble metal catalyst component such as Pt in the mechanism of releasing NOx from the NOx absorbing and reducing catalyst. At this moment, the noble metal catalyst component has been heated, too, and exhibits an increased catalytic activity. Accordingly, NOx that has migrated onto the noble metal catalyst component from the absorbent actively reacts with the HC, CO and $H_2$ components in the exhaust gas, and is reduced. That is, the rise in the temperature of the NOx absorbing and reducing catalyst promotes both the rate of releasing NOx from the NOx absorbing and reducing catalyst and the reducing reaction of NOx that is released, contributing to greatly improving the purification ratio of NOx.

As described above, the rise in the temperature of the NOx absorbing and reducing catalyst due to the reaction on the oxygen storage component takes place only when NOx is released from the NOx absorbing and reducing catalyst (i.e., when the exhaust gas air-fuel ratio is changed over to a rich air-fuel ratio) and within a very short period of time, contributing greatly to improving the purification ratio of NOx. For example, when the temperature of the NOx absorbing and reducing catalyst is raised by increasing the exhaust gas temperature or by being heated by a heater, the NOx purification ratio is not improved to a sufficient degree compared with when the oxygen storage component is disposed. It has been known that in a region higher than a given temperature, the NOx absorbing and reducing catalyst exhibits a decreased NOx absorbing capability when the air-fuel ratio is lean. The NOx absorbing capability (maximum amount of NOx absorption) of the NOx absorbing and reducing catalyst is given as a point where the rate of NOx absorbed by the absorbent (e.g., BaO) of the NOx absorbing and reducing catalyst is balanced with the rate of releasing NOx from the absorbent. Here, however, the rate of releasing NOx increases with a rise in the temperature of the absorbent. When the absorbent is heated higher than a given point, therefore, the NOx absorbing capability of the NOx absorbing and reducing catalyst decreases with a rise in the temperature. At the time of absorbing NOx (lean air-fuel ratio operation), therefore, when the temperature of the NOx absorbing and reducing catalyst is raised in excess of a given value, then, the NOx absorbing capability of the NOx absorbing and reducing catalyst drops. When NOx is being released from the NOx absorbing and reducing catalyst (rich air-fuel ratio operation), on the other hand, the NOx reducing efficiency increases with an increase in the temperature of the NOx absorbing and reducing catalyst. In order to improve the NOx reducing efficiency and to provide a generally high NOx purification ratio without decreasing the absorbing capability of the NOx absorbing and reducing catalyst, therefore, it becomes necessary to maintain the NOx absorbing and reducing catalyst at a relatively low temperature when NOx is being absorbed by the NOx absorbing and reducing catalyst (during the lean air-fuel ratio operation) and to maintain the NOx absorbing and reducing catalyst at a relatively high temperature when NOx is being released (during the rich air-fuel ratio operation).

Upon adjusting the temperature of the NOx absorbing and reducing catalyst by controlling the exhaust gas temperature or by the heater, however, it is not allowed to change the temperature of the NOx absorbing and reducing catalyst within a short period of time. During the lean air-fuel ratio operation, therefore, the temperature of the NOx absorbing and reducing catalyst is heated excessively resulting in a drop in the NOx absorbing capability or, during the rich air-fuel ratio operation, the temperature of the NOx absorbing and reducing catalyst is not raised to a sufficient degree and NOx is not sufficiently reduced. When the oxygen storage component is disposed close to the NOx absorbing and reducing catalyst as in this embodiment, on the other hand, the temperature of the NOx absorbing and reducing catalyst can be raised within a very short period of time when the air-fuel ratio of the exhaust gas is changed from the lean side to the rich side. During the lean air-fuel ratio operation, therefore, the NOx absorbing and reducing catalyst is maintained at a relatively low temperature to prevent a drop in the NOx absorbing capability. During the rich air-fuel ratio operation, on the other hand, the temperature of the NOx absorbing and reducing catalyst is raised within a short period of time to improve the NOx purification ratio as a whole.

② Formation of $H_2$ by the oxygen storage component.

Another reason why the oxygen storage component disposed near the NOx absorbing and reducing catalyst helps improve the NOx purification ratio of the NOx absorbing and reducing catalyst is thought to be that $H_2$ is formed by the oxygen storage component during the rich air-fuel ratio operation.

For example, the ceria ($CeO_2$) that is used as the oxygen storage component reacts with the $H_2$ and CO components in the exhaust gas as the air-fuel ratio of the exhaust gas changes from the lean side to the rich side, whereby oxygen is removed from the ceria due to the reactions represented by the above-mentioned formulas (1) and (2) and the ceria is transformed into $Ce_2O_3$. Under the rich air-fuel ratio condition, however, $Ce_2O_3$ reacts with $H_2O$ in the exhaust gas in the direction opposite to that of the formula (2) to form $H_2$. That is,

$$Ce_2O_3 + H_2O \rightarrow 2CeO_2 + H_2 \qquad (3)$$

$H_2$ is highly reductive compared to HC and CO. Therefore, when $H_2$ exists in the exhaust gas while NOx is being released, NOx released from the NOx absorbing and reducing catalyst is reduced highly efficiently, and the NOx purification ratio of the NOx absorbing and reducing catalyst is improved as a whole. Accordingly, the oxygen storage component disposed close to the NOx absorbing and reducing catalyst improves the purification ratio of the NOx absorbing and reducing catalyst.

As described above, the purification ratio of the NOx absorbing and reducing catalyst is improved upon disposing the oxygen storage component on the upstream side of the NOx absorbing and reducing catalyst at a position close thereto, because of either one or both of the above-mentioned reasons ① and ②.

In this embodiment, the oxygen storage component is carried only by the upstream half portion of the substrate of the NOx absorbing and reducing catalyst. This is because NOx is occluded by the NOx absorbing and reducing catalyst from the side of the front end of the substrate (exhaust gas inlet side) during the lean air-fuel ratio operation. When the rich spike operation is effected in a state where NOx is occluded by the NOx absorbing and reducing catalyst in an amount considerably smaller than its saturation amount as done in this embodiment, therefore, most of NOx is released from the upstream half of the substrate of the NOx absorbing and reducing catalyst.

Figure 3:
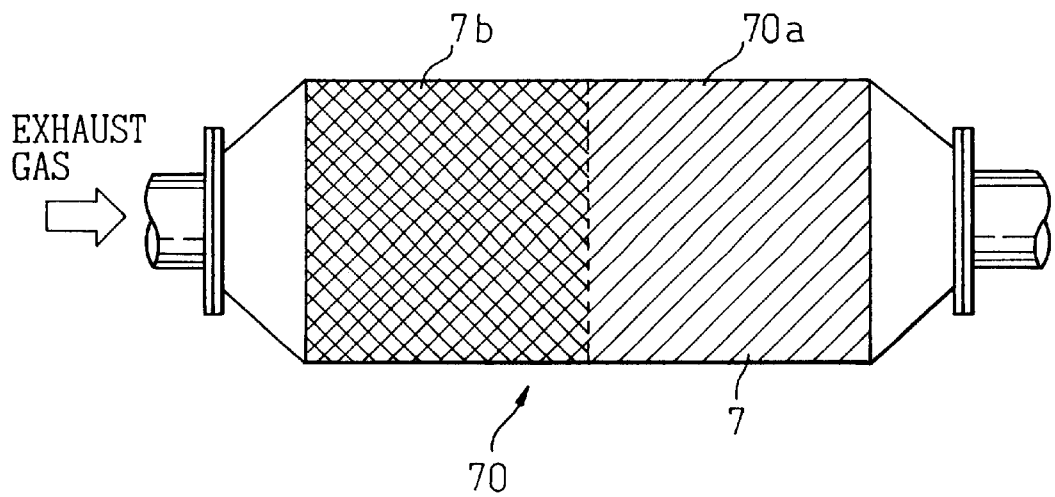
FIG. 3 is a sectional view illustrating the constitution of another embodiment of the converter of FIG. 1.

FIG. 3 is a diagram illustrating the constitution of the converter 70 of FIG. 1 according to an embodiment different from that of FIG. 2. In FIG. 3, the same reference numerals as those of FIG. 2 denote the same elements as those of FIG. 2. In this embodiment, the upstream half portion 7b of the substrate carries the oxygen storage component such as cerium which is the same as that of the embodiment of FIG. 2, as well as three-way catalyst components such as platinum Pt, rhodium Rh and the like. That is, according to this embodiment, the upstream half portion 7b of the carrier works as the NOx absorbing and reducing catalyst and as the three-way catalyst having the $O_2$ storage capability.

In this embodiment, the three-way catalyst components carried by the upstream half of the substrate together with the NOx absorbing and reducing catalyst produce the following actions.

(1) Prevents the NOx absorbing and reducing catalyst from being contaminated with HC and CO when the rich spike operation is effected.

When the engine operating air-fuel ratio is changed from the lean side to the rich side by the rich spike operation, the amounts of HC and CO components sharply increase in the exhaust gas. Here, however, the HC and CO components both easily deposit on the catalyst components such as platinum and the like of the NOx absorbing and reducing catalyst. When the amounts of HC and CO components in the exhaust gas rapidly increase while the air-fuel ratio is being changed, therefore, the surfaces of the catalyst components of the NOx absorbing and reducing catalyst are covered with the deposited HC and CO components, giving rise to the occurrence of so-called HC contamination and CO contamination by which the effective surface areas of the catalyst are decreased. When these contaminations occur, the reactions $NO_3^- \rightarrow NO_2$ and $NOx \rightarrow N_2$ take place little, and the NOx purification ratio of the NOx absorbing and reducing catalyst decreases.

On the other hand, when the upstream half 7b of the substrate of the NOx absorbing and reducing catalyst works as a three-way catalyst having the $O_2$ storage capability as in this embodiment, the HC and CO components in the exhaust gas flowing in during the rich spike operation partly react on the three-way catalyst components with oxygen released from the oxygen storage component, and are oxidized, suppressing the amounts of HC and CO components reaching the NOx absorbing and reducing catalyst components from sharply increasing. Therefore, the HC and CO contaminations do not occur in the early period of the rich spike operation, preventing a drop in the NOx purification ratio of the NOx absorbing and reducing catalyst.

(2) Prevents HC contamination during the lean air-fuel ratio operation.

In an engine which executes the stratified charge combustion (above-mentioned combustion modes ① and ②) during the lean air-fuel ratio operation as the engine 1 of this embodiment, the amount of HC component in the exhaust gas becomes larger during the lean air-fuel ratio operation than that of the engine that executes the uniform mixture combustion. Even during the lean air-fuel ratio operation, therefore, HC deposits on the NOx absorbing and reducing catalyst may occur in this case, and the NOx purification ratio of the NOx absorbing and reducing catalyst may decrease due to the contamination. In this embodiment, the upstream half portion 7b of the substrate works as a three-way catalyst. During the lean air-fuel ratio operation, therefore, the HC component in the exhaust gas flowing into the substrate is oxidized on the three-way catalyst components upon reacting with oxygen in the exhaust gas, and HC deposit on the NOx absorbing and reducing catalyst is decreased. This prevents the HC contamination of the NOx absorbing and reducing catalyst when the stratified charge combustion is executed during the lean air-fuel ratio operation.

(3) Formation of $H_2$ by the water-gas-shift reaction.

The three-way catalyst establishes the water-gas-shift reaction $CO + H_2O \rightarrow H_2 + CO_2$ under the rich air-fuel ratio condition to convert CO in the exhaust gas into $H_2$. $H_2$ is highly reductive compared to HC and CO. When $H_2$ exists in the exhaust gas while NOx is being released from the NOx absorbing and reducing catalyst, therefore, the released NOx is purified at an increased ratio. As described above, further, the CO deposits on the NOx absorbing and reducing catalyst to cause CO contamination. By imparting the function of the three-way catalyst to the upstream half portion 7b of the substrate as in this embodiment, therefore, it is allowed to suppress the CO contamination of the NOx absorbing and reducing catalyst while forming $H_2$ which serves as a reducing agent.

That is, the converter 70 of this embodiment produces the actions described in (1) to (3) above in addition to the action due to the oxygen storage component of FIG. 2.

Next, described below is the constitution of the converter 70 of FIG. 1 according to a further embodiment.

Figure 4:
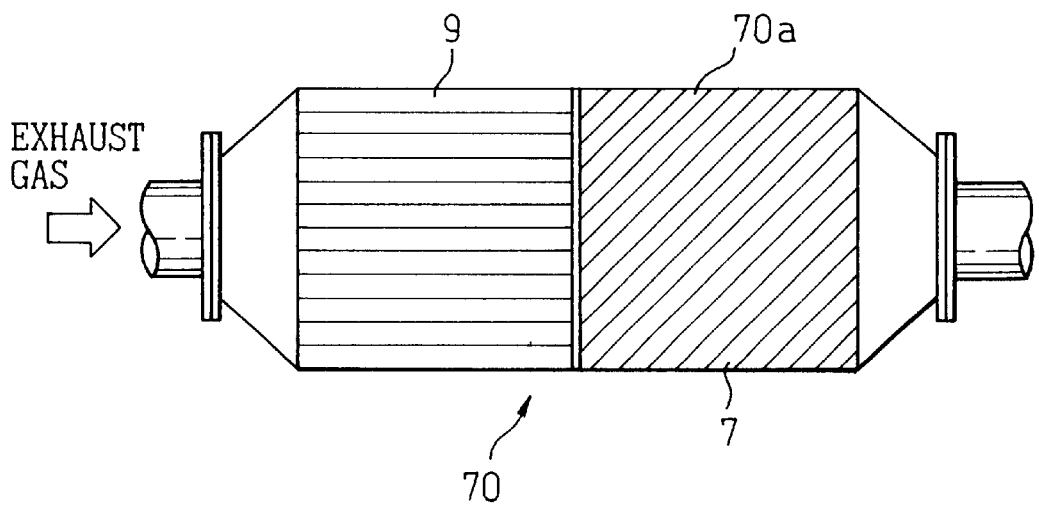
FIG. 4 is a sectional view illustrating the constitution of a further embodiment of the converter of FIG. 1.

FIG. 4 is a sectional view similar to those of FIGS. 2 and 3, and illustrates the constitution of the converter 70 of the embodiment. In FIG. 4, the same reference numerals as those of FIGS. 2 and 3 denote the same elements as those of FIGS. 2 and 3. The converter 70 is of the form containing the three-way catalyst 9 and the NOx absorbing and reducing catalyst 7 in a casing 70a, the three-way catalyst 9 being disposed on the upstream side of the NOx absorbing and reducing catalyst 7 (on the side of the exhaust gas inlet of the casing 70a). The three-way catalyst 9 according to this embodiment is obtained by carrying the three-way catalyst components such as platinum Pt, rhodium Rh and palladium Pd on the alumina layer formed on the substrate such as of cordierite like the NOx absorbing and reducing catalyst 7. Further, unlike those of FIGS. 2 and 3, the NOx absorbing and reducing catalyst 7 works solely as the NOx absorbing and reducing catalyst which carries neither the oxygen storage components nor the three-way catalyst components in the upstream half portion of the substrate. In this embodiment, the three-way catalyst 9 and the NOx absorbing and reducing catalyst 7 are separately formed and are arranged neighboring each other (the three-way catalyst 9 and the NOx absorbing and reducing catalyst 7 may be arranged to intimately contact each other or may be arranged maintaining a relatively small gap therebetween). In this embodiment, the exhaust gas flows into the NOx absorbing and reducing catalyst 7 after having passed through the three-way catalyst 9.

In this embodiment, the oxygen storage component is added to the three-way catalyst 9 to impart the $O_2$ storage capability thereto to obtain the three actions, i.e., (1) prevention of the HC and CO contaminations when the rich spike operation is executed as explained in the embodiment of FIG. 3, (2) prevention of the HC contamination during the lean air-fuel ratio operation, and (3) formation of $H_2$ by the water-gas-shift reaction. When the oxygen storage component is not added, i.e., when the three-way catalyst without $O_2$ storage capability is used, the above-mentioned actions (2) and (3) are obtained.

When the three-way catalyst 9 and the NOx absorbing and reducing catalyst 7 are arranged neighboring each other as shown in FIG. 3, it has been found through experiment that a maximum NOx purification ratio is obtained when the volume ratio of the three-way catalyst 9 and the NOx absorbing and reducing catalyst 7 is set to be nearly 1 to 1.

Described below are the components carried by the upstream portion (the three-way catalyst 9) and the downstream portion (the NOx absorbing and reducing catalyst 7) of the converter used in the embodiment and their amounts.
(A) NOx Absorbing and Reducing Catalyst 7 (Downstream Portion).

The alumina layer carries platinum (Pt), rhodium (Rh), zirconia ($ZrO_2$), barium (Ba), lithium (Li), potassium (K) and baked cerium (Ce) in amounts as described below.

Pt/Rh=2.5/0.25 grams/liter,

Ba–Li–K=0.2–0.1–0.1 mols/liter,

Ce=20 grams/liter, $ZrO_2$=50 grams/liter.

(B) Three-way Catalyst 9 (Upstream Portion)

The alumina layer carries platinum (Pt), rhodium (Rh), zirconia ($ZrO_2$) and cerium (Ce). Cerium and zirconia are added as composite oxides but are not baked. Their amounts are as follows:

Pt/Rh=1.5/0.3 grams/liter,

Ce, $ZrO_2$ (composite oxides)=75 grams/liter.

Since the composite oxides of Ce and $ZrO_2$ have not been baked, the three-way catalyst 9 exhibits a very large $O_2$ storage capability compared with the NOx absorbing and reducing catalyst 7. When the volume is the same, therefore, it is estimated that the three-way catalyst 9 is capable of absorbing and releasing about 10 times as much oxygen as of the NOx absorbing and reducing catalyst 7.

In this embodiment, further, the three-way catalyst 9 and the NOx absorbing and reducing catalyst 7 use the substrates of the same diameter.

Figure 5:
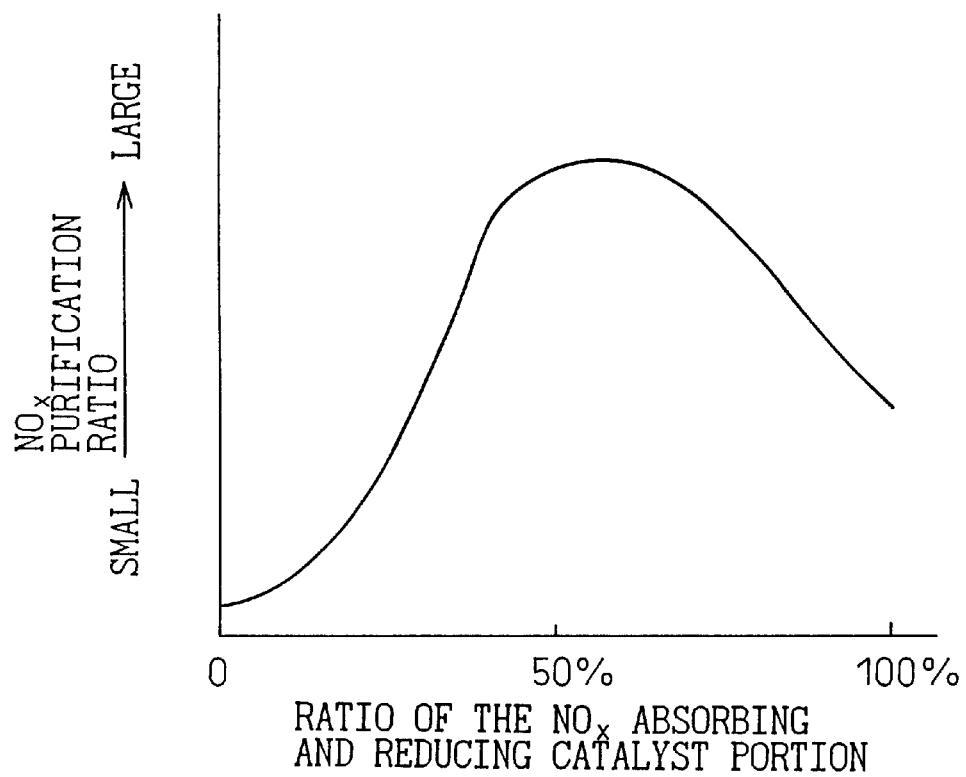
FIG. 5 is a graph illustrating the NOx purification ratio of the converter of the embodiment of FIG. 4.

FIG. 5 is a graph illustrating the measured results of a change in the NOx purification ratio of the whole converter by changing the ratio of the lengths (volume ratio) of the NOx absorbing and reducing catalyst 7 and of the three-way catalyst 9 of the converter 70. In FIG. 5, the ordinate represents the NOx purification ratio (ratio of NOx purified by the converter 70 among NOx in the exhaust gas flowing into the converter 70), and the abscissa represents the ratio of the length of the substrate of the NOx absorbing and reducing catalyst 7 to the total length of the substrate of the three-way catalyst 9 and of the substrate of the NOx absorbing and reducing catalyst 7.

In the converter of this embodiment, the NOx purification ratio becomes a maximum when the ratio of the length of the NOx absorbing and reducing catalyst 7 is about 50%. In the converter 70 of this embodiment, therefore, a maximum purification ratio is obtained when the length of the NOx absorbing and reducing catalyst 7 and the length of the three-way catalyst 9a are equal to each other, i.e., when the volume ratio of the two is nearly 1 to 1.

Next, described below is the converter 70 of FIG. 1 according to an embodiment different from those of FIGS. 2 to 4.

Figure 6:
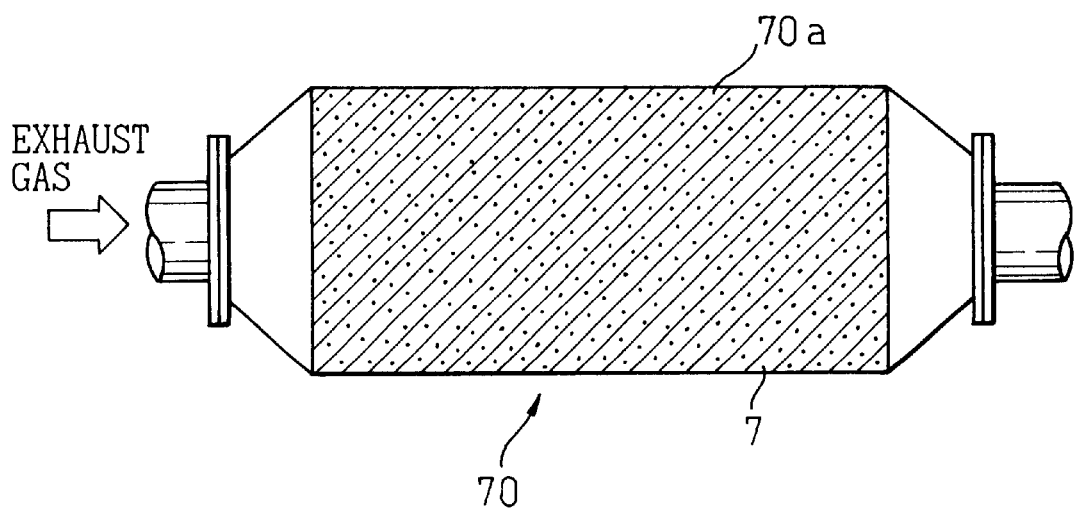
FIG. 6 is a sectional view illustrating the constitution of another embodiment of the converter of FIG. 1.

FIG. 6 is a diagram similar to FIG. 2 and illustrates the constitution of the converter 70 according to this embodiment. In this embodiment, the NOx absorbing and reducing catalyst and the cerium as the oxygen storage component are carried by the substrate as in the embodiment of FIG. 1. Here, however, the cerium is carried not only in the upstream half portion but also over the full length of the substrate. In the embodiment of FIG. 1, the NOx absorbing and reducing catalyst component and the oxygen storage component are carried in a mixed state by the substrate. In this embodiment, however, the NOx absorbing and reducing catalyst component and the oxygen storage component are carried in a state of being isolated in the form of layers as will be described below.

Figure 7:
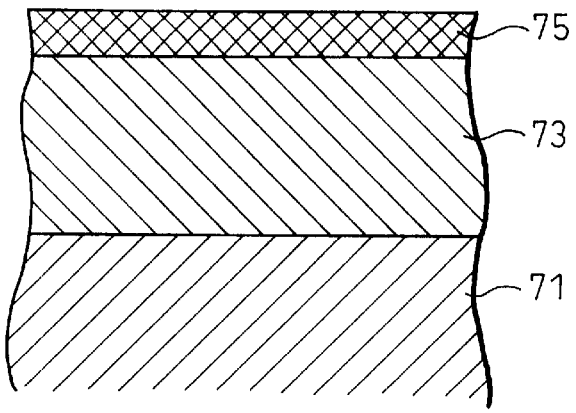
FIG. 7 is a view illustrating the constitution of the converter of FIG. 6 in detail.

FIG. 7 is a sectional view schematically illustrating the state of carrying the NOx absorbing and reducing catalyst component and the oxygen storage component according to this embodiment.

According to this embodiment as shown in FIG. 7, the so-called two-layer-coated structure is employed in which a NOx absorbing and reducing catalyst layer 73 is formed on the substrate 71 and, an oxygen storage component layer 75 is formed on the NOx absorbing and reducing catalyst layer 73. The exhaust gas, first, passes through the porous oxygen storage component layer 75 and, then, reaches the NOx absorbing and reducing catalyst layer 73 of the lower side. In this case, too, the oxygen storage component is disposed on the upstream side of the NOx absorbing and reducing catalyst component close thereto.

In this embodiment, too, the honeycomb-shaped cordierite or the like material is used as the substrate 71, which is then coated with alumina to carry the above-mentioned NOx absorbing and reducing catalyst components (e.g., noble metal components such as Pt, Rh, etc. and NOx absorbent such as barium Ba) thereby to form the NOx absorbing and reducing catalyst layer 73.

The oxygen storage component layer 75 is obtained by forming a porous layer of such as zeolite on the upper side (outer side) of the alumina coating and carrying noble metals and oxygen storage components on this layer. In this embodiment, among the zeolite-type materials, mordenite is used as a carrying layer for the oxygen storage component layer 75, and platinum Pt, which is a noble metal, and cerium Ce, which is an oxygen storage component, are carried by the mordenite layer.

The thickness of the oxygen storage component layer 75 is smaller than the thickness of the NOx absorbing and reducing catalyst layer 73, i.e., about 1/6 to about 1/5 of the thickness of the NOx absorbing and reducing catalyst layer 73.

Described below is the effect of when the oxygen storage component layer 75 and the NOx absorbing and reducing catalyst layer 73 are arranged as a two-layer-coated structure as contemplated in this embodiment.

In this embodiment, too, heat is generated by the NOx absorbing and reducing catalyst layer 73, and $H_2$ is formed by the oxygen storage component layer when NOx is being released like in the embodiment of FIG. 1. In this embodiment in which the oxygen storage component layer 75 and the NOx absorbing and reducing catalyst layer 73 are arranged as a two-layer-coated structure, however, the whole NOx absorbing and reducing catalyst layer is uniformly and intimately adhered to the oxygen storage component layer enabling the temperature of the NOx absorbing and reducing catalyst to be raised more efficiently and $H_2$ to be supplied more efficiently by the oxygen storage component layer.

Upon forming the zeolite (mordenite in this embodiment) layer on the NOx absorbing and reducing catalyst layer 73 to carry a noble metal (Pt in this embodiment) according to this embodiment, there can be obtained a further effect.

The exhaust gas from the internal combustion engine contains sulfur oxide (SOx) formed by the burning of a sulfur component contained in the lubricating oil and fuel. SOx in the exhaust gas is absorbed by the NOx absorbing and reducing catalyst to form sulfate (e.g., $BaSO_4$) in the absorbent in accordance with the same mechanism as that of absorbing NOx under the lean air-fuel ratio condition. However, the sulfate formed in the absorbent is stable compared to nitrate, and is not released under the condition in which NOx is released from the NOx absorbing and reducing catalyst but gradually builds up in the NOx absorbing and reducing catalyst. As SOx builds up in increased amounts in the absorbent in the NOx absorbing and reducing catalyst, the amount of the absorbent that can take part in the absorption of NOx decreases, and the NOx absorbing capability (maximum amount of NOx absorption) of the NOx absorbing and reducing catalyst decreases, i.e., a so-called SOx contamination occurs. Upon forming the zeolite layer on the NOx absorbing and reducing catalyst layer according to this embodiment, SOx in the exhaust gas is adsorbed by the zeolite as the exhaust gas passes through the porous layer, and virtually no SOx is contained in the exhaust gas arriving at the NOx absorbing and reducing catalyst layer 73. Therefore, the SOx contamination of the NOx absorbing and reducing catalyst does not occur. Besides, SOx is adsorbed by the zeolite without forming sulfate such as $BaSO_4$ in the manner similar to that of physical adsorption. Therefore, SOx is easily desorbed under the normal condition where NOx is released from the NOx absorbing and reducing catalyst. SOx that is desorbed is released into the exhaust gas without coming in contact with the lower NOx absorbing and reducing catalyst layer 73 and is not absorbed by the NOx absorbing and reducing catalyst. That is, in this embodiment, the oxygen storage component layer 75 formed on the NOx absorbing and reducing catalyst layer 73 also works as an SOx trap to easily adsorb and desorb Sox. In this embodiment in which noble metal components such as Pt and the like are carried by the zeolite layer, further, $SO_2$ in the exhaust gas is oxidized and is converted into $SO_3$ as it passes through the zeolite layer. $SO_3$ is more easily adsorbed by the zeolite than $SO_2$ and is easily desorbed from the zeolite at a relatively low temperature (e.g., about 300° C.) in a rich air-fuel ratio atmosphere. In this embodiment, therefore, the oxygen storage component layer 75 exhibits further improved performance as the SOx trap.

In this embodiment, the oxygen storage component layer is formed over the full length of the substrate of the NOx absorbing and reducing catalyst. As described earlier, however, the amount of NOx absorbed by the NOx absorbing and reducing catalyst tends to increase in the upstream half portion of the substrate. As in the embodiment of FIG. 1, therefore, the two-layer-coated structure may be formed in the upstream half portion of the substrate only, and the oxygen storage component layer may be formed in the upstream half portion only of the substrate.

Next, described below are the carried amounts of the oxygen storage components in the cases of FIGS. 1, 6 and 7. As described above, the oxygen storage components are disposed on the upstream side of the NOx absorbing and reducing catalyst close thereto to improve the NOx purification ratio of the NOx absorbing and reducing catalyst. In order to maximize the NOx purification ratio, however, the carried amount of the oxygen storage component must be adjusted to lie within an optimum range. When the oxygen storage component is carried in too small an amount, for example, heat is generated in a small amount by the reaction of the $H_2$ and CO components with the oxygen storage component when the air-fuel ratio of the exhaust gas becomes rich and, hence, the temperature of the NOx absorbing and reducing catalyst components is not raised to a sufficient degree. When the oxygen storage component is carried in too large an amount, on the other hand, heat is generated in sufficiently large amounts by the reaction. However, in this case, a large portion of the $H_2$ and CO components in the exhaust gas are oxidized by the oxygen storage component on the upstream side, and the reducing components are not supplied in a sufficient amount to the NOx absorbing and reducing catalyst so that the released NOx is not reduced to a sufficient degree.

Figure 8:
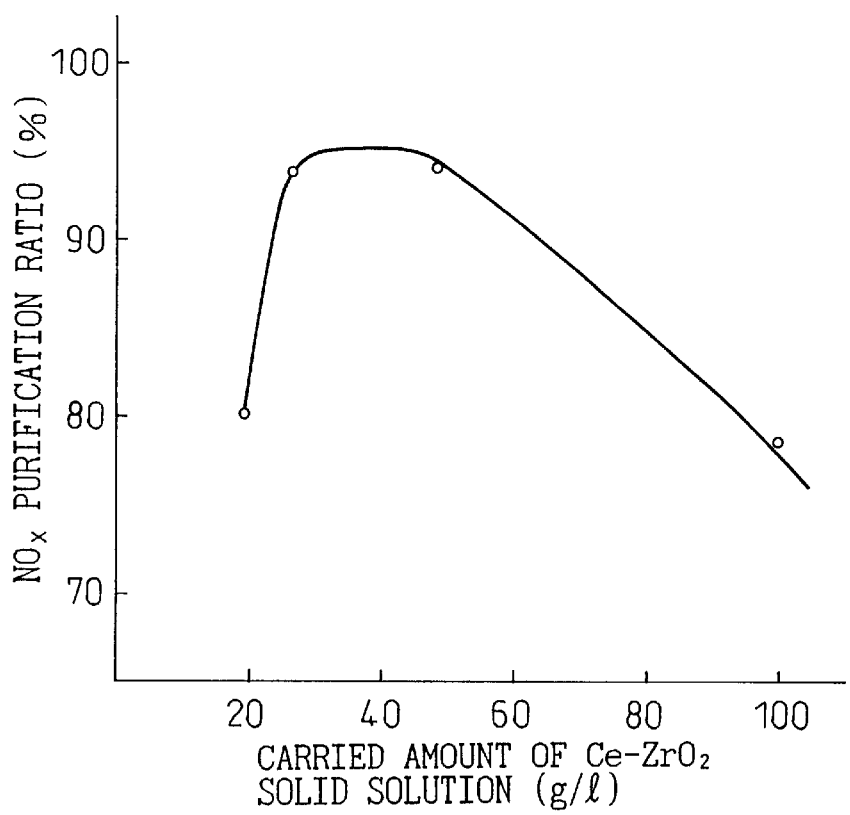
FIG. 8 is a view illustrating a change in the NOx purification ratio based on the amounts of the oxygen storage components that are carried.

FIG. 8 is a graph illustrating the measured results of a change in the NOx purification ratio of the NOx absorbing and reducing catalyst as a whole while changing the amount of the oxygen storage component (cerium) carried by a portion of the NOx absorbing and reducing catalyst of the upstream side (or of the upper layer side) in the embodiment of FIG. 1 or FIGS. 6 and 7. FIG. 8 illustrates the case where the cerium as an oxygen storage component is carried in the form of a ceria-zirconia solid solution ($CeO_2$ and $ZrO_2$ at a molar ratio of 1 to 1). It has been found that the NOx purification ratio of the NOx absorbing and reducing catalyst as a whole is most improved when the ceria-zirconia solid solution is carried in an amount within a range of from 30 grams/liter to 50 grams/liter.

What is claimed is:

1. An exhaust gas purification device for an internal combustion engine, comprising an $NO_x$ absorbing and reduced catalyst which absorbs $NO_x$ in the exhaust gas when the air-fuel ratio of the exhaust gas flowing in is lean and realeases the absorbed $NO_x$ and purifies it by reduction when the air-fuel ratio of the exhaust gas flowing in is rich, disposed in an exhaust passage of the interal combustion engine operable at at least one of a lean air-fuel ratio and a rich air-fuel ratio so that the $NO_x$ absorbing and reducing catalyst absorbs $NO_x$ in the exhaust gas when the engine is operated at a lean air-fuel ratio and that absorbed $NO_x$ is released from the $NO_x$ absorbing and reduced catalyst and is purified by reduction when the engine is operated at a rich air-fuel ratio;

wherein oxygen storage components are carried by a substrate of said $NO_x$ absorbing and reducing catalyst solely on the upstream half portion of the substrate from an end surface on the exhaust inlet side up to a central portion thereof, in order to absorbed oxygen when the air-fuel ratio of the exhaust gas is rich.

2. An exhaust gas purification device for an internal combustion engine according to claim 1, wherein the three-way catalyst components are carried by the upstream half portion of said substrate.

3. An exhaust gas purification device for an internal combustion engine according to claim 1, wherein the oxygen storage component in the upstream half portion of the substrate of said $NO_x$ absorbing and reducing catalyst is cerium carried in the form of a ceria-zirconia solid solution, and the carried amount of said solid solution is in a range of from 30 grams/liter to 50 grams/liter.

* * * * *

UNITED STATES PATENT AND TRADEMARK OFFICE
CERTIFICATE OF CORRECTION

PATENT NO.      : 6,499,294 B1
DATED           : December 31, 2002
INVENTOR(S)     : Kenji Kato et al.

It is certified that error appears in the above-identified patent and that said Letters Patent is hereby corrected as shown below:

Column 19,
Line 11, after "in order to" insert -- absorb oxygen in the exhaust gas when the air-fuel ratio of the exhaust gas is lean and to release the --.

Signed and Sealed this

Second Day of September, 2003

JAMES E. ROGAN
*Director of the United States Patent and Trademark Office*